United States Patent
Drew et al.

[11] 3,763,020
[45] Oct. 2, 1973

[54] TERPENE RECOVERY BY MULTI-EFFECT EVAPORATION WITH VENT VAPOR COMPRESSION

[75] Inventors: John Drew; Robert Elliott Marks, both of Jacksonville, Fla.

[73] Assignee: Envirotech Corporation, Salt Lake City, Utah

[22] Filed: Feb. 11, 1971

[21] Appl. No.: 114,651

[52] U.S. Cl.................. 203/14, 203/27, 203/39, 203/47, 203/26, 203/80, 203/DIG. 14, 202/174, 202/185 A, 99/105, 159/17 R, 159/47 WL, 162/16, 162/239, 260/236.6, 260/675.5
[51] Int. Cl....... B01d 1/26, D21c 11/00, A23l 1/02
[58] Field of Search .................. 203/14, 26, 27, 25, 203/DIG. 14, 47, 73, 80; 159/17 R, 24, 47 WL; 162/14, 16, 239; 202/174, 205, 185 A; 99/105, 206; 260/236.6, 675.5

[56] References Cited
UNITED STATES PATENTS

| | | | |
|---|---|---|---|
| 2,941,590 | 6/1960 | Rosenblad | 159/47 WL |
| 3,176,755 | 4/1965 | Harman | 202/174 |
| 3,607,617 | 9/1971 | Drew | 162/239 |
| 3,647,476 | 4/1972 | Swisher | 99/105 |
| 3,489,654 | 1/1970 | Geiringer | 202/174 |
| 3,432,402 | 3/1969 | Herringer et al. | 203/37 |
| 3,492,198 | 1/1970 | Rosenblad | 162/239 |
| 3,117,877 | 1/1964 | Byer et al. | 99/105 |
| 3,557,085 | 1/1971 | Douglas | 99/105 |
| 2,181,731 | 11/1939 | Hinckley | 202/174 |

*Primary Examiner*—Wilbur L. Bascomb, Jr.
*Attorney*—Robert R. Finch

[57] ABSTRACT

A process for recovering dispersed or solubilized terpenes from terpene-containing aqueous liquors during the multiple effect evaporative concentration of said aqueous liquors is disclosed. The terpenes are recovered by condensing uncondensed vent vapors from the "condensing vapor zone" of an evaporation effect being fed with vaporized terpene-containing aqueous liquors by raising the pressure on said uncondensed vent vapors so as to raise the dew point temperature of the terpene component. The temperature of the vent gases is also lowered below the dew point temperature to condense terpenes therefrom.

21 Claims, 2 Drawing Figures

TERPENE RECOVERY BY MULTI-EFFECT EVAPORATION WITH VENT VAPOR COMPRESSION

This invention pertains to a process for the recovery of terpenes from aqueous liquors containing terpenes. More particularly, this invention relates to the recovery of terpenes from aqueous liquors containing terpenes in rather small concentrations wherein the terpenes are present in dispersed or in solubilized form; and phase separation by decantation or centrifugation is impractical.

As used herein, the term "terpenes" refers to the volatile, normally liquid, water-immiscible, naturally occurring, acyclic and cyclic substances comprising at least about 70 percent by weight $C_{10}H_{16}$ hydrocarbons derived from vegetative source materials, primarily coniferous trees and citrus fruit rinds; but also including to a lesser extent other vegetable sources such as grasses, weeds, hay, plant leaves and organic wastes therefrom. The terpenes derived from the woodpulping of trees are known as turpentine; and the terpenes derived from citrus fruit rinds contains in excess of 90 percent by weight of limonene and hence are known as citrus limonene.

In one aspect, this invention relates to the recovery of turpentine from woodpulping processes from the alkaline cooking liquor stream known as black liquor. This aspect of the invention provides an excellent method for controlling pollution of the atmosphere and water within the vicinity of woodpulping mills.

In another aspect, this invention relates to the recovery of citrus limonene as a by-product from citrus fruit juice extraction processes. This aspect also provides environmental pollution abatement.

In the woodpulping process, a digester vessel is charged with woodchips and an alkaline solution of cooking liquor. The woodchips can be charged on a batch basis or continuously as in the commercial wood-pulping process known as the "Kamyr" process. In either batch or continuous processes, the woodchips are then digested at elevated temperatures (e.g., 340° F. to 355° F.) and pressures (e.g., 100 to 180 psig) to produce fibrous woodpulp and gaseous by-products containing water, turpentine and other valuable chemicals.

Black liquor is the name given to the cooking liquor separated from the woodpulp after digestion and contains among other things sodium hydroxide, sodium sulfate, sodium sulfite, sodium phenate, sodium salts of lignin materials (lignates), fatty acid soaps, rosin soaps, unsaponifiable organic compounds and a small amount (i.e., about 0.0005 to 0.02 percent by weight) of dispersed or solubilized turpentine. The turpentine is apparently held in dispersed or solubilized form in the black liquor by lignin compounds, soaps and other surface-active materials that are present.

Because this turpentine is solubilized or dispersed, it does not separate as an immiscible phase from the black liquor; and thus the turpentine cannot be effectively removed from the black liquor by decantation or centrifugation.

When the black liquor is concentrated by evaporation to recover the chemical components, the turpentine is also vaporized. In the past, the recovery of turpentine vapors from the concentration of black liquor by condensation and decantation has been ineffective because the prior technique failed to consider the very low concentration of turpentine in the vapor; and most of the turpentine was lost as noncondensible gases discharged from the evaporators or was condensed and lost because it was dissolved in the condensate water. These noncondensed gases are normally vented to the atmosphere as waste gases which waste valuable turpentine as well as providing a source of atmospheric pollution. The dissolved turpentine in the condensate is a source of water pollution in the mills' effluent.

A similar problem is present in the recovery of citrus limonene from citrus fruit juice extraction and concentration processes. In these citrus juice extraction and concentration processes, fruit such as oranges, tangerines, grapefruits, limes and lemons are mechanically squeezed or reamed to extract juice therefrom; and the juice is concentration by multiple effect evaporation to produce fruit juice concentrate. As by-products of these juice extraction and concentration processes, significant proportions of citrus limonene are recoverable. For instance, during the extraction of juice from the fruit in the extractor, the peel is flushed with water to form a peel oil/water emulsion from which peel oil can be separated in a centrifugal separator to yield an oil overflow phase known as cold press oil. Unfortunately, a great deal of peel oil is lost as peel oil/water emulsion in the aqueous underflow phase from the centrifugal separator.

Another source of peel oil is the peel itself. After extraction of the juice the wet peel is treated with lime, disintegrated in a hammer mill and pressed to produce "pressed peel" and an aqueous dispersion known as peel liquor. The streams (i.e., the peel oil/water emulsion and/or the peel liquor) can be completely or partially flash vaporized to form wet gaseous streams from which terpenes can be recovered by the present invention.

In the past, attempts have been made to recover the turpentine from the uncondensed vent vapors from the evaporative concentration of black liquor. For instance the article, "Turpentine Recovery for Continuous Digesters", by L. B. Jansson, appearing in *TAPPI Journal*, Volume 50, Number 4, of April, 1967, theorizes that the turpentine is stripped from black liquor during the multiple effect evaporation process and proposes venting the "steam chest" of each effect to a common vent line which discharges into a direct or contact condenser where the turpentine and water vapors are condensed for recovery by direct contact with an aqueous sodium hydroxide solution. The condenser is vented in parallel to the steam jet ejector system evacuating the boiling liquid zone of the last evaporation effect.

This system has not been commercially accepted because of the very low yield of turpentine. Such low yields of turpentine are due to several factors. First of all, the condenser is operated at very low pressure as it vents directly to the steam jet system at about 1 to 2 psia or lower. Under these low pressures, the temperature of saturated steam is about 100° F. to 130° F.; and the dew point temperature of turpentine is much lower than the temperature of saturated steam. Very low temperatures will be required to condensed any turpentine from the vapor phase at this pressure. The achievement of such low temperatures is impractical if not impossible with cooling water which is typically 60° to 90° F. Moreover, this article proposes the use of a direct condenser wherein the cooling liquid is in direct contact with the vapors being condensed. This adds a significant volume of water to any liquid turpentine that may be condensed and thereby increases the volume of water that must be removed during the phase separation portion of the recovery. This increases solubility and carry-over losses of turpentine in the aqueous underflow phase. Furthermore, the direct condensing liquid is a caustic solution which acts as an emulsifying agent in forming interphase emulsions between any condensed turpentine and water.

Another system is proposed in the article entitled, "There's gold in those gases—turpentine, ready for the collecting", by L. Y. Liu, in the October, 1969, issue of *Pulp and Paper*. This article proposes the collection of all noncondensible gases from the gaseous exhaust from the last stage steam jet of the black liquor evaporators. White liquor is used to scrub the gas at a temperature of 212° F., and a cooler is used to condense the gas after scrubbing. The condensate from the cooler which contains turpentine is decanted from a hot well turpentine decanter. By collecting only the gaseous exhaust from the last steam jet, a substantial amount of turpentine is lost.

U. S. Pat. No. 3,432,402 proposes a process for increasing the yield of turpentine by-products from the continuous digestion sulfate paper process which comprises reheating the black liquor to a temperature of about 330° to 400° F., flashing the reheated black liquor and condensing the resulting volatilized turpentine. This approach is based on the theory that turpentine recovery is low under conventional continuous digestion conditions because some of the turpentine remains in the black liquor in a bound, polymeric or otherwise non-volatile form due to the somewhat milder temperature and pressure employed in the continuous digestion process as compared with the more severe conditions of the batch digestion process. By reheating the black liquor, the bound turpentine is released or converted to a volatilizable form along with the volatile or non-volatile turpentine from the black liquor of the continuous digester. By transfer to a zone of lower pressure, the black liquor containing the volatile turpentine is vaporized or flashed and thereafter condensed. This patent does not propose the recovery of turpentine from selected vent vapors from a multiple effect evaporator and is only concerned with a specialized high temperature, high pressure depolymerization technique for releasing turpentine from black liquor.

In accordance with one feature of the invention, turpentine is recovered from the vapors evolved during the multiple effect evaporation of black liquor by condensing turpentine from the uncondensed vent vapors from the "condensing vapor zone" of at least one of the evaporation effects being heated with vapors formed by evaporating black liquor. The condensation of turpentine from the uncondensed vent vapors is conducted at a pressure higher than the pressure in the condensing vapor zone of the particular evaporation effect being vented to raise the dew point temperature of the turpentine component of the vent vapors thereby allowing turpentine to be condensed at a higher temperature. The temperature of the vent vapors is also lowered to more efficiently condense turpentine.

In the black liquor evaporators, the uncondensed vent vapors from the "condensing vapor zone" are particularly enriched in turpentine because most of the water vapor has already been condensed as the "condensing vapor" in liberating heat to the "boiling liquid" in the boiling liquid zone. Each evaporation effect is of the heated surface type wherein heat is transferred from a "condensing vapor zone" at a given pressure through the heated surface to a boiling liquid zone maintained at a pressure lower than the pressure in the condensing vapor zone. The vapors produced in the boiling liquid zone of one effect pass to the condensing vapor zone of the next effect to transfer heat to the "boiling liquid zone" of that next effect. Thus, evaporation is accomplished in each effect by transferring heat from the condensing vapor zone to boiling liquid zone while maintaining the pressure in the boiling liquid zone lower than the pressure in the condensing vapor zone to cause a corresponding decrease in the boiling point of the liquor in the boiling liquid zone.

In each boiling liquid zone where black liquor is being vaporized, the vapors produced are enriched in turpentine according to the laws of distillation. Furthermore, when these vapors are passed to the condensing vapor zone of the next effect even though the main portion of the water vapor is condensed, the major proportion of the turpentine present does not condense because the turpentine remains in the vapor form in molar proportion to the vapor pressures of turpentine and water at any time both water and turpentine are present in liquid form, irrespective of the presence of noncondensibles. Thus, the turpentine remains in the form of uncondensed vent vapors. The turpentine is then recovered by condensing the uncondensed vent vapors by indirect heat exchange at increased pressure so as to raise the dew point temperature of turpentine and produce a two-phase condensate from which turpentine can be recovered by decantation, centrifugation or other conventional phase separation techniques for immiscible liquids. Raising the pressure raises the dew point temperature of turpentine and then makes it possible to condense turpentine at higher temperature as by indirect heat exchange with cooling water at 60° to 90° F.

The term "dew point temperature" is used herein in the conventional sense and refers to the temperature at which the vapor phase becomes saturated with a given component at the prevailing pressure and is the temperature at which the partial pressure of the component in the vent vapors equals the vapor pressure.

Accordingly, the uncondensible vent vapors from the condensing vapor zone in each effect where black liquor is being concentrated is enriched in turpentine (e.g., 5 percent to 10 percent by weight of turpentine with the balance being water vapor, air, mercaptans and sulfides).

In theory, the pressure should be raised as high as is possible, and the temperature of condensation should be as low as possible to optimize turpentine recovery. As a practical matter, however, high superatmospheric pressures require specialized equipment; and very low temperatures require refrigeration units, which equipment is quite expensive. Accordingly, it has been found that material improvements in the level of turpentine condensation can be achieved by increasing the pressure on the uncondensed vent vapors to atmospheric pressure while reducing the temperature to as low as possible with the available cooling water (typically available in the range of 60° to 90° F.).

The compressing and cooling of the vent vapors can be accomplished by steam jet ejection or mechanical compression. Usually the vent vapors are compressed and cooled in a single or multistage steam jet ejector system. In one type of multistage steam jet ejection, the uncondensed vent vapors can be withdrawn from the condensing vapor zone of one of the effects where the pressure is 6 psia and the temperature 170° F. by throttling into the steam jet ejector system operating with the suction to the first stage jet at 3 psia. The first stage compresses the vapor to 5 psia, and the compressed vapors from the first stage jet are condensed in an indirect interstage condenser to a temperature of 150° F. to form a two-phase condensate containing immiscible turpentine and water phases. The uncondensed vapors from the interstage condenser are vented to the suction of the second steam jet ejector stage where the vapors are further compressed to atmospheric pressure. These compressed vapors at atmospheric pressure are then further condensed in a second indirect heat exchanger to form a two-phase condensate containing immiscible turpentine and water phases.

In another vent vapor compression technique, the vent vapors can be partially condensed in an indirect condenser with the indirect condenser being vented to a single stage steam jet ejector which compresses the vapors to atmospheric pressure. The compressed vapors are then indirectly condensed to yield terpene and water phases.

The immiscible condensate phases are then separated by density differential into a turpentine overflow phase and an aqueous underflow phase. Preferably, the immiscible phases are separated at a temperature ranging from 125° F. to the boiling point of the combined phases and most preferably at 140° F. to 200° F. according to the principles of copending application S. N. 751,425 filed Aug. 9, 1968 and now U.S. Pat. No. 3,607,617, the teaching of which is incorporated by reference.

Alternatively, the immiscible condensate phases can be separated by any conventional method for separating immiscible liquid such as liquid-liquid extraction, electrical discharge phase agglomeration as shown in U. S. Pat. No. 3,356,603 (the teaching of which is incorporated by reference), steam distillation, reverse osmosis, ultrafiltration, preferential adsorption or absorption of one of the liquid phases on a sorptive medium, and phase coalescense by surface tension.

The actual pressure increase to which the vent vapors must be subjected depends upon the composition of the vent vapors. The dew point temperature of turpentine will be reached when the partial pressure of the turpentine in the vent vapors equals the vapor pressure of turpentine at the temperature of the vent vapors.

In that the partial pressure of turpentine is directly proportional to the mole fraction of turpentine in the vent vapors, higher turpentine concentrations will mean higher dew point temperatures. Furthermore, since partial pressure = (total pressure) X (mole fraction), increasing the total pressure will also have the effect of raising the dew point temperature of turpentine. Thus, when an increase in pressure is accompanied by a decrease in temperature, turpentine recovery by condensation is enhanced. Usually the pressure on the vent vapors is raised at least about 2 psi and preferably at least about 7 psi above the pressure in the condensing vapor zone of the effect from which the vapors are withdrawn to achieve a significant elevation in the dew point temperature. This is readily accomplished by compressing vent vapors to atmospheric pressure in one, two or more stages of compression. This feature is illustrated below.

Assume the uncondensed vent vapors in one of the condensing vapor zones of one of the effects has a weight ratio of 20 parts of water per part of turpentine at a total pressure of 7.35 psia (or 360 mm of Hg). The vapor will also include some noncondensibles such as air, mercaptans and sulfide. The content of these components depends on the leakage rate of ambient air into the effects under reduced pressure, the type of wood being digested and the composition of the cooking liquor. These parameters vary from mill to mill and will be initially neglected. Under these conditions (water-to-turpentine ratio of 20:1 at a total pressure of 7.35 psia), the dew point temperature of turpentine is about 34° F. by the following calculations.

Assume 2,100 lbs. of vapor so the water and turpentine content will be:

| Component | Lbs. | Mol Weight | Mols | Mol% |
|---|---|---|---|---|
| water | 2,000 | 18 | = 111.0 | |
| turpentine | 100/2,100 | 136 | = 0.735/111.735 | =0.66 |

Since mol percent = pressure percent, the partial pressure of turpentine is (0.0066) (360 mm) = 2.5 mm Hg.

The temperature at which the vapor pressure of turpentine is 2.5 mm of Hg is 34° F., so the dew point temperature is 34° F. at 7.35 psia.

If the pressure were increased to atmospheric pressure of 14.7 psia (or 760 mm of Hg) the partial pressure of turpentine would be (0.0066) (760 mm) = 5 mm of Hg and the temperature at which the vapor pressure of turpentine is 5 mm of Hg is 83° F., so the dew point temperature of turpentine is 83° F. at atmospheric pressure. Thus, turpentine will begin to condense at 83° F. at atmospheric pressure as compared to 34° F. at 7.35 psia.

If the pressure were increased to 29.4 psia (or 1,520 mm of Hg), the partial pressure of turpentine would be (0.0066) (1520 mm) = 10 mm of Hg and the temperature at which the vapor pressure of turpentine is 10 mm of Hg is 100° F., so the dew point temperature of turpentine is 100° F. at 29.4 psia.

Assuming now that 10 mole percent of air, mercaptans and other noncondensibles are added to uncondensed vent vapors. Then there are $$\frac{111.0 \text{ moles water}}{122.935 \text{ total moles}} \frac{0.735 \text{ mole turpentine}}{} \frac{11.2 \text{ moles of noncondensibles}}{} = 0.60 \text{ mole percent turpentine}$$

Then at 14.7 psia (or 760 mm of Hg) the partial pressure will be (0.0060) (760) = 4.5 mm of Hg and the temperature at which the vapor pressure of turpentine is 4.5 mm of Hg is about 78° F., so the dew point temperature would be 78° F. as compared to 83° F. in the absence of noncondensibles.

In accordance with a second feature of the invention, citrus limonene is recovered from the vapors evolved during the multiple effect evaporation of citrus peel liquor and citrus fruit juice by condensing citrus limonene from the uncondensed vent vapors from the "condensing vapor zone" of at least one of the evaporation effects being heated with vapors formed by evaporating peel liquor, vapors formed by evaporating citrus oil/water emulsion, vapors formed by evaporating aqueous underflow from the cold press oil centrifuge and vapors formed by evaporating fruit juice. The uncondensed vapors are enriched in citrus limonene. The condensation is by indirect heat exchange and is conducted at a pressure higher than the pressure in the "condensing vapor zone" of the particular evaporation effect so as to raise the dew point temperature of citrus limonene and allow for condensation citrus limonene at a relatively higher temperature.

Thus, the invention has three essential elements:

The withdrawal of the uncondensed vent vapors from the condensing vapor zone of an evaporation effect being fed with vapors formed by vaporizing black liquor, vapors formed by vaporizing aqueous citrus limonene-containing liquors, or other wet, gaseous streams containing terpenes;

Raising the pressure on said vent vapors to raise the dew point temperature of the terpene component;

Condensing the terpene component at a temperature below the dew point of the terpene components by indirect heat exchange.

The above and other objects, features and advantages of the present invention will be more readily apparent by reference to the drawings wherein:

FIG. 1 will be explained in detail with respect to Example 1.

Figure 1:
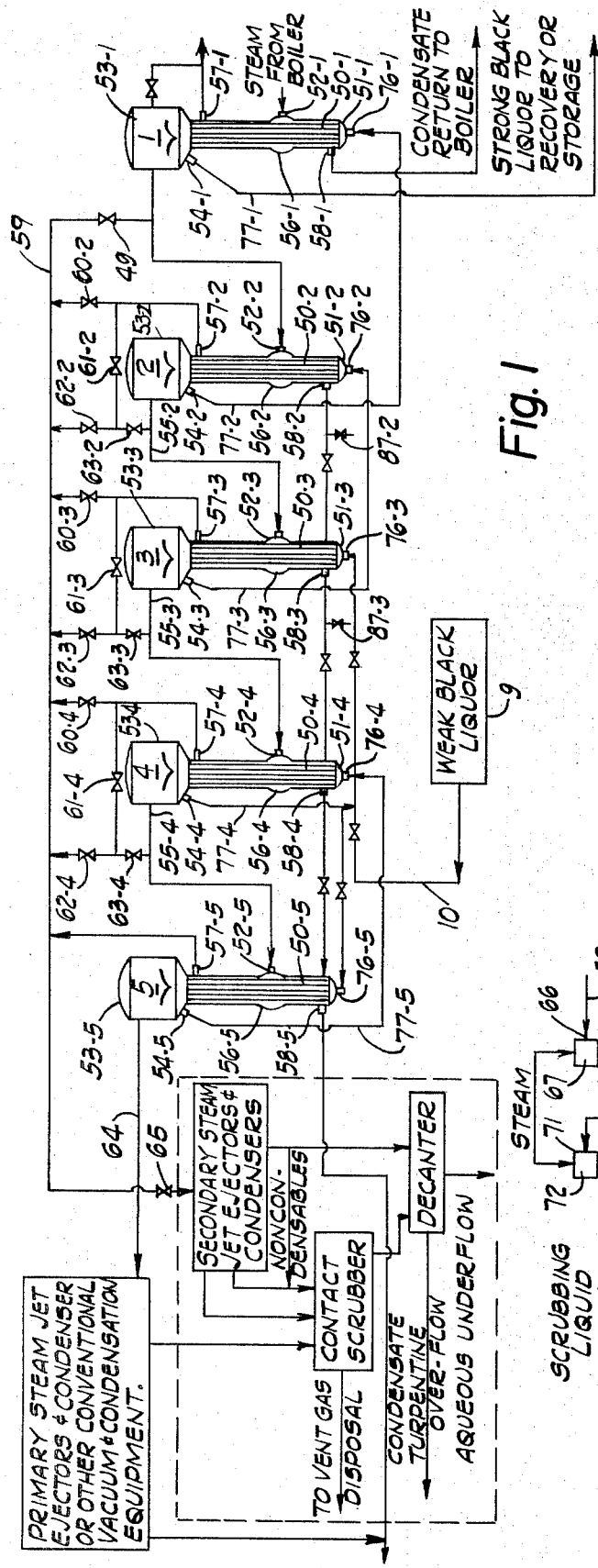
FIG. 1 is a schematic flow diagram illustrating the basis of design of a plant for recovering turpentine from a multiple effect evaporation process wherein black liquor is being concentrated.

As background for FIG. 1, in the pulping phase of the process (not shown), woodchips are fed to the digesters together with cooking liquor. During the cooking procedure, steam is admitted to the digesters to elevate the temperature and pressure therein. After the wood has been digested, the digester contents are removed and pass to pulp washers. Black liquor is removed from the digester, and a portion of the water vapor is flash vaporized therefrom as the pressure is reduced from digesting pressure to atmospheric pressure. This black liquor is known as "weak black liquor" and contains about 15 percent to 20 percent by weight of solids and about 0.02 percent of dispersed or solubilized turpentine.

As shown in FIG. 1, weak black liquor from storage tank 9 passes through conduit 10 to a multiple effect evaporator system wherein the weak black liquor is subjected to concentration in a plurality of successive stages of evaporation. The multiple effect evaporator system is illustrated as including five effects. The effects are designated with numerals 1 through 5, with effect "1" being the "first effect", effect "2" being the "second effect" and so on down the line. In the specification, the effects are conventionally numbered. That is, the last (or highest numbered) effect is that in which the vapor dome pressure is a minimum; and the first (or lowest numbered) effect is that in which the vapor dome pressure is maximum. The numbering of the effect is independent of the order liquor is fed to them. The method of feeding can be any conventional method such as the forward feed where the weakest liquor is fed to the first effect and is concentrated in turn in the other effects; the backward feed in which the weakest is fed to the last effect and then pumped through successive stages to the first effect; the mixed feed where the weakest liquor enters an intermediate effect, flows in forward feed to the end of the series and is pumped back to the first effect for final concentration; the parallel feed where weak liquor is fed directly to each effect; or combinations of same.

The reference numerals for the evaporation effects are suffixed to each effect. Thus, for instance, the reference numeral 76 refers to the feed inlet port generally for any effect; and the number 76-2 refers to the feed inlet port for the second effect. The evaporators are identical and are of conventional design having a shell 56 enclosing a tube bundle 50 through which the black liquor introduced through header 51 rises and boils. Partially evaporated and concentrated black liquor emerges from the top of the tube bundle 50, collects in the lower end of vapor dome 53 and drains from vapor dome 53 through outlet 54 to storage or further concentration in other evaporation effects. The vapors collected in the vapor dome 53 are exhausted through conduit 55. Thus, the tube bundle 50 and vapor dome 53 comprise the boiling liquid zone of an evaporation effect.

Heat is transferred through tube bundle 50 from shell 56. Shell 56 encloses tube bundle 50 and is supplied with heating vapor through inlet 52. As heat is transferred through the bundle 50 to the boiling liquid, the steam vapor in shell 56 condenses to form a liquid condensate which drains through outlet 58. This condensate can be passed along from the shell of one effect to the next effect through the series of effects for further utilization of the sensible heat. As shown in FIG. 1, the condensate passes from outlet 58-2 to shell 56-3 and so on down the line of effects. This technique is known as "cascading" the condensate. Cascading the condensate from condensing vapor zones containing vapors resulting from the evaporation of black liquor is the preferred method of operation because any turpentine that might be condensed in the condensate will be flash vaporized from the condensate in the next effect. This method thus provides for stripping of any turpentine to prevent turpentine losses with the condensate. Alternatively, the condensate can be withdrawn in parallel from each effect through conduits 87. In the case of the first effect, the shell 56-1 is heated with boiler steam through inlet 52-1 containing no turpentine; so the condensate is returned from outlet 58-1 to the boiler for reuse.

Because vapors are condensing in the shell 56, the shell is known as the condensing vapor zone. The noncondensed vapors in shell 56 pass through vent 57. These noncondensed vapors are referred to as "vent vapors." The piping and valving on vents 57 are arranged so that the vent vapors from shell 56 can be vented in parallel to header 59 or passed along to the shell of the next effect. For instance, when valves 60-2 and 62-2 are closed and valves 61-2 and 63-2 are open, the vent vapors from shell 57-2 will pass along to the shell 56-2 through inlet 52-3. This technique is known as "cascading" the vent vapors from shell to shell, and this is the usual procedure. Alternatively, when valve 60-2 is open and 61-2 is closed, vent vapors from outlet 57-2 will flow directly into header 59. When the shell of each effect is vented in this manner, the shells are said to be vented in parallel. The vent vapors from each of shells 56-2 through 56-4 can be vented in parallel or cascaded. Furthermore, when the vapors are cascaded, a portion thereof can be drawn off in parallel. Valves 62-2 through 62-4 and valves 63-2 and 63-4 are provided to allow venting of vapor domes 53-2 through 53-4 to header 59. In the usual practice of the invention, vapor domes 53-2 through 53-4 will not be vented to header 59.

The vapors collected in vapor dome 53 are exhausted through conduit 55 to the shell 56 of the next effect where the vapors liberate heat and are condensed. For instance, the vapors in vapor dome 53-2 flow through conduit 55-2 through inlet 52-3 to shell 56-3. Thus, the pressure in vapor dome 53-2 and shell 56-3 will theoretically be the same. The vapor dome 53-5 (the last effect) is vented by conduit 64 to the primary steam jet ejector and condensers or other conventional vacuum and condensation equipment illustrated schematically in FIG. 1.

The primary steam jet ejector is of conventional design wherein the vapors are compressed by high pressure steam (e.g., 150 psig) in the throat of a Venturi-type ejector. The steam jets handle large volumes of low density vapor. The jets are usually arranged in stages with two or more steam jet ejectors in series having a surface condenser succeeding the first stage jet and an "intercondenser" between the stages. Noncondensible gas is vented from the steam jets to the atmosphere or a scrubber. Header 59 connects to secondary steam jet ejectors and condensers through valve 65.

EXAMPLE 1

In operation, the weak black liquor from storage vessel 9 containing about 15 percent solids by weight and 0.02 percent turpentine is fed through conduit 10 to inlet port 76-3 of the boiling liquid zone of the third effect and inlet port 76-4 of boiling liquid zone of the fourth effect in parallel feed. The temperature in the boiling liquid zone of the third effect is about 190° F., and the pressure is about 9.3 psia. The temperature in the boiling liquid zone of the fourth effect is about 165° F. The pressure is about 5.2 psia. Before entering concentrated black liquor flowing through conduit 77-4 from the fourth effect and partially concentrated black liquor flowing through conduit 77-5 so that the feed entering the inlet port 76-3 and 76-4 has a solids content of about 18 to 23 percent by weight. The feeding technique minimizes the foaming of black liquor upon evaporation in the third and fourth effects by increasing the solid concentration thereof. This provides for efficient evaporation and undue loss of turpentine.

The black liquor is concentrated in the fourth effect to about 22 to 25 percent solids by vaporization water and turpentine. At least about 90 percent of the 0.02 percent turpentine content of the black liquor is vaporized in the fourth effect. The resulting turpentine vapor and water are at a temperature of about 165° F. and 5.2 psia in vapor dome 53-4. The vapors in vapor dome 53-4 are withdrawn through conduit 55-4 and flow to inlet 52-5 of the condensing vapor zone of the fifth effect where it serves as a heating fluid. The thickened liquor at 22 to 25 percent solids at a temperature of 165° F. and a pressure of 5.2 psia from the boiling liquid zone of the fourth effect is withdrawn through outlet 54-4. From outlet 54-4 the black liquor at 22 to 25 percent solids flows through conduit 77-4 where part of it flows as the feed stream to the boiling liquid zone of the fifth effect at inlet 76-5, and the other part of the black liquor in conduit 77-4 is diverted and mixed with weak incoming black liquor in conduit 10 to raise the solids content thereof to about 18 to 23 percent for feeding the third and fourth effects in parallel as described above.

In the boiling zone of the fifth effect where temperature is about 130° F. and the pressure is about 2.4 psia, the black liquor is further concentrated to about 30 percent solids by vaporization water with the vapor fraction being withdrawn through conduit 64 to the primary steam jet ejectors and condensers. The thickened black liquor at about 30 percent solids is pumped from the boiling liquid zone of the fifth effect through outlet 54-5 through conduit 77-5 and blended with incoming weak black liquor in conduit 10 for raising the solids contents of the weak black liquor feed to 18 to 23 percent.

By this technique, weak black liquor containing turpentine is not fed directly to the fifth or last effect because the vapors generated from the evaporation in the last effect are not fed to the condensing vapor zone of a subsequent effect. Thus, there would be no opportunity to recover turpentine therefrom because the vapors generated in the last effect are fed directly to the primary steam jet ejectors where turpentine recovery is impractical because the large volume of steam, air, mercaptans and other noncondensibles render turpentine recovery impractical. The liquid fed to the boiling liquid zone of the last effect has already been flashed at least once in the fourth effect so that at least a substantial portion of the turpentine (in excess of 90 percent) will have been flashed therefrom.

Black liquor in the boiling liquid zone of the third effect at a temperature of 190° F. and 9.3 psia is concentrated to about 30 percent solids by vaporization of water and about 90 percent of the available turpentine. The thickened black liquor at 30 percent solids flows through outlet port 54-3 through conduit 77-3 and serves as a feed liquor for the boiling liquid zone of the second effect through inlet port 76-2. The vapor fraction from the boiling liquid zone of the third effect flows through conduit 55-3 to the condensing vapor zone of the fourth effect at 190° F. and 9.3 psia and serves as the heating fluid for the fourth effect through inlet 52-4. Black liquor in the boiling liquid zone of the second effect at 214° F. and 15 psia is concentrated to 44 percent solids by evaporation of water. The thickened black liquor at 44 percent solids flows from the second effect through line 77-2 and serves as the feed liquor to the first effect through inlet port 76-1. The vapor fraction from the boiling liquid zone of the second effect at 214° F. and 15 psia flows through conduit 55-2 and serves as the heating fluid for condensing vapor zone of the third effect through inlet 52-2.

Black liquor in the boiling liquid zone of the first effect at 228° F. and 20 psia is concentrated in about 50 percent solids by evaporation of water, and the strong black liquor leaves through port 54-1 through conduit 77-1 where it is sent to storage. The vapor fraction at 228° F. and 20 psia from the first effect flows through conduit 55-1 and flows to the condensing vapor zone of the second effect through inlet 52-2. The condensing vapor zone of the first effect is fed with boiler steam at 267° F. and 40 psia through port 52-1. Condensate from the condensing vapor zone or shell 56-1 is returned to the boiler. Uncondensed vent vapors from shell 56-1 contain no turpentine and are vented to the atmosphere.

The uncondensed vent vapors from shell 56–2 through shells 56–5 are cascaded in series from shell to shell by closing valves 49, closing valves 60–2 through 60–4, closing valves 62–2 through 62–4, opening valves 61–2 through 61–4 and opening valves 63–2 through 63–4. All of the vent vapors are thus accumulated in shell 56–5 for recovery through the secondary steam jet ejectors.

Alternatively, the uncondensed vent vapor from shells 56–2 through 56–5 can be vented in parallel to header 59 by opening valves 60–2 through 60–4 and closing valves 61–2 through 61–4 and closing valves 62–2 through 62–4. This parallel venting technique is used when the total concentration of noncondensibles such as air and mercaptans are so high as to interfere with efficient heat transfer in the later effects. Moreover, the vent vapors from the shells can be cascade in series with a fraction vented in parallel.

Figure 2:
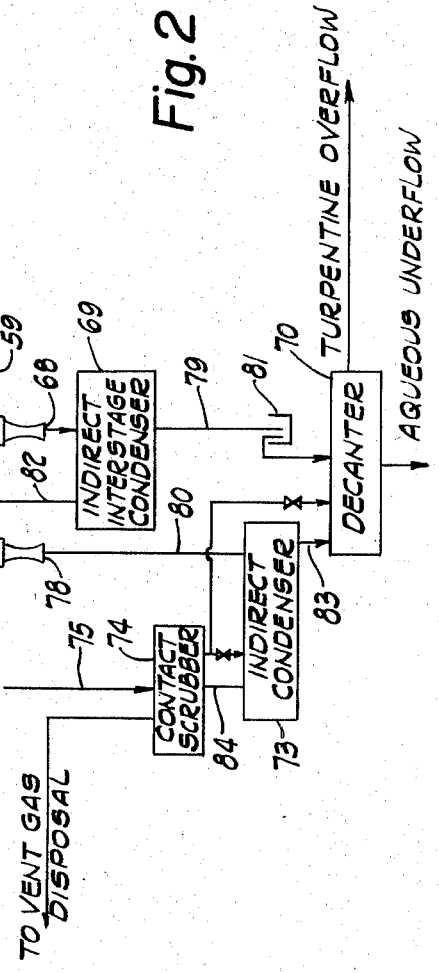
FIG. 2 is a detailed illustration of the steam jet ejector system illustrated schematically in FIG. 1.

Secondary steam jet ejectors and condensers are illustrated schematically in FIG. 1 and in more detail in FIG. 2. Header 59 is connected to suction port 66 of the first steam jet ejector stage 67 which operates typically at 1 psia which is below the pressure in any of the shells 56–2 through 56–5 so that vent vapors can be readily withdrawn therefrom. First steam ejector stage 67 is fed with high pressure steam at about 150 psig. Vapors in steam jet ejector 67 are compressed by the action of the high pressure steam to form a mixture of steam and partially condensed turpentine and water. Steam jet ejectors 67 discharge through nozzle 68 to an indirect interstage condenser 69 where the pressure is typically 3 to 10 psia at a temperature of 140° F. to 195° F. and usually about 4.5 psia at 150° to 160° F. Cooling water at as low a temperature as possible flows through indirect interstage condenser to achieve the temperature of the turpentine/water mixture therein. The liquid condensate from the interstage condenser 69 flows through barometer leg 79 to hotwell 81. Hotwell 81 discharges to decanter 70 where the turpentine separates as the aqueous overflow phase and the water separates as the underflow phase by density differential. Alternatively, the hotwell 81 can be eliminated and barometric leg 79 can discharge directly beneath into decanter 70 beneath the liquid level in order to effect a pressure seal. Preferably, the phase separation in the decanter 70 is accomplished at a temperature between about 125° F. to the boiling point of the condensate and most preferably at temperatures of 140° F. to 200° F. for efficient phase separation in accordance with copending application S.N. 751,425, and now U.S. Pat. No. 3,607,617 the disclosure of which is incorporated by reference.

The indirect interstage condenser 69 at about 4.5 psia and 150° F. to 160° F. is vented to the suction port 71 of the second steam jet ejector stage which is also being fed with high pressure steam at 150 psig. The vent gases from indirect condenser 69 are further compressed and condensed in second steam jet ejector stage 72, and the compressed and condensed gases are exhausted through nozzle 78 and conduit 80 to indirect condenser 73 operating at atmospheric pressure. Indirect condenser 73 can be operated in the manner disclosed in S. N. 751,425, and now U.S. Pat. No. 3,607,617 where cooling water is circulated through indirect condenser 73 to further condense water and turpentine vapor from the exhaust gases from second steam jet ejector stage 72. The two-phase liquid condensate flows from indirect condenser 73 and to the decanter 70 for separation of a turpentine overflow phase and an aqueous underflow phase by density differential as described above. The vent gases from indirect condenser 73 are vented to contact scrubber 74 such as a column packed with Rashig rings or berl saddles where the vapors are further condensed and scrubbed by direct contact with cold water entering through stream 75. The liquid condensate from scrubber 74 can be returned to indirect condenser 73 through conduit 86 or flow to decanter 70 through line 85 by appropriate valve settings. Vent gases from contact scrubber 74 are then vented for disposal.

When black liquor is concentrated as described above with cascading the condensate and the vent vapor from shells 56–2 through 56–4 into shell 56–5 and withdrawing the vent vapor in shell 56–5 at 165° F. and 5.2 psia into header 59 and into secondary steam jets through inlet 66, the turpentine recovery based on 10,000 lbs. of weak black liquor is as follows:

Ten thousand lbs. of weak black liquor contain:

8,498 lbs. water 1,500 lbs. solids (sodium salts, etc.)

2 lbs. turpentine

These 10,000 lbs. of weak black liquor are concentrated in five effects to strong black liquor containing:

1,500 lbs. water 1,500 lbs. solids

In concentrating in the five effects, 7,498 lbs. of water and 2 lbs. of turpentine are vaporized.

There are 7,498 lbs. of water vaporized in the combined five effects so that an average of 1,500 lbs. of water is evaporated per effect. According to the vapor/liquid equilibrium existing between black liquor and turpentine, at least about 90 percent to 95 percent of the turpentine (or about 1.8 to 2 lbs.) is vaporized in the effect where the weak black liquor is first flashed. This occurs in the third and fourth effects in the system described above. Thus, in the combined boiling liquid zones of the third and fourth effects, about 3,000 lbs. of water and 1.8 to 2.0 lbs. of turpentine are vaporized. When the vapors from the boiling liquid zone of the third effect are condensed in the condensing vapor zone of the fourth effect and the vapors from the boiling liquid zone of the fourth effect are condensed in the condensing vapor zone of the fifth effect, about 2,985 lbs. of water (99+ percent) are condensed leaving about 15 lbs. of water and 1.8 to 2 lbs. of turpentine as uncondensed vent vapors together with whatever air, mercaptans and other noncondensibles are present in the condensing vapor zones of the third and fourth effects. The vent vapors from the condensing vapor zone of the second effect are cascaded through the third and fourth effects to the condensing vapor zone of the fifth effect to pick up residual turpentine. These uncondensed vent vapors in the condensing vapor zone of the fifth effect are enriched in turpentine in the ratio of about 15 parts of water vapor to about 1 part of turpentine vapor as a result of cascading 7 to 8 parts of water vapor from each of the four effects together with 2 lbs. of turpentine. These uncondensed vent vapors are compressed to atmospheric pressure and condensed to form two immiscible liquid phases in the ratio of about 15 parts of water per part of turpentine and decanted at about 150° F. as described above in connection with FIG. 2 to yield 1.8 to 2 lbs. of turpentine per 10,000 lbs. of weak black liquor charged. Heretofore, this turpentine has been lost to the atmosphere.

In a typical pulp mill operation, the incremental increase in turpentine recovery can amount to 300 gallons more per day. Heretofore, this 300 gallons of turpentine was discharged directly to the surrounding air or water as a pollutant. Turpentine and associated sulfur compounds are a major source of odor in gaseous mill effluents and have a high biological oxygen demand (BOD) in liquid effluents. Thus, the elimination of 300 gallons or more of turpentine effluent per day provides a material reduction in the discharge of pollutants.

EXAMPLE 2

When orange juice from a juice extractor, which juice contains 12 percent by weight of sugars, pectins and other dissolved citrus solids, together with about 0.4 pounds of citrus limonene per 1,110 pounds of juice is concentrated in a five-effect evaporator system (similar to the system in FIG. 1 and FIG. 2 but with concurrent flow of juice concentrate and heating vapors) to orange juice concentrate at 58 percent solids, citrus limonene is recovered as follows:

In the first effect, orange juice at 12 percent solids is charged into the tubes; and boiler steam at 214° F. and 15 psia is in the shell. The pressure in the tubes and vapor dome of the first effect is 9.3 psia which corresponds to a juice boiling temperature of 190° F. The vapors formed by boiling the juice in the first effect are fed as the heating medium to the shell of the second effect while the partially concentrated fruit juice from the tubes of the first effect are fed to the tubes of the second effect for further concentration. The vapors and liquids flow through the third, fourth and fifth effects in this manner. In each effect, the pressures are preselected so that the vapor condensation temperature in the shell is about 20° to 25° F. above the juice boiling temperature in the tubes. The uncondensed vent vapors from the shell of effects 2 through 4 are cascaded to the shell of the fifth effect from which they are withdrawn, compressed, condensed and decanted into a citrus limonene overflow phase and an aqueous underflow phase by the method described above in Example I. The condensate is also cascaded through the shells of effects 2 through 5.

In the fifth effect the temperature in the vapor dome is about 125° F. at 2 psia, and the temperature in the shell is about 140° F. at 3 psia. The liquid orange juice concentrate discharged from the fifth effect contains about 58 percent of dissolved citrus solids.

When operating as described above, about 0.3 pounds of the available 0.4 pounds are recovered (75 percent recovery) for every 1,110 pounds of orange juice fed to the evaporator for concentration. In a typical commerical operation wherein 6,000 tons per day of oranges are processed, about 1,800 pounds per day of limonene are recovered. This is about 75 percent of the available limonene and represents an improvement in yield of about 900 pounds per day over existing recovery methods.

EXAMPLE 3

In a similar manner, the invention is applied to the operation of the multiple effect evaporation system concentrating peel press liquors and/or peel oil/water emulsion to form cirtrus molasses. It is understood that the peel oil/water emulsion includes the aqueous underflow from the centrifugal separator from which cold press oil is being removed as the overflow phase. In a typical operation, aqueous peel press liquors (i.e., liquors pressed from the disintegrated peel) contain about 2.4 pounds of citrus limonene per 610 pounds of aqueous liquor, and the peel oil/water emulsion contains 5.6 pounds of citrus limonene per 463 pounds of water. By centrifuging this peel oil/water emulsion, about 4.4 pounds of citrus limonene can be removed as cold press oil leaving about 1.2 pounds of citrus limonene in the 463 pounds of water discharged as the aqueous underflow from the centrifuge. These peel press liquors and peel oil/water emulsions (with or without centrifuging to remove cold press oil) streams can be combined for evaporation to citrus molasses. For the purpose of this example, the combined streams 1,073 pounds of aqueous phase (i.e., 463 pounds of peel oil/water emulsion + 610 pounds of peel press liquors) contain 6 percent by weight of dissolved sugars, pectin and other citrus solids together with about 8 pounds of citrus limonene.

Upon concentration of the above combined streams to citrus molasses at 72 percent by weight of soluble solids in a five-effect evaporation process wherein the uncondensed vent vapors from the condensing vapor zones in effects 2 through 5 are withdrawn, compressed, condensed and decanted as in Example 2, about 6 pounds of citrus limonene are recovered for every 1,073 pounds of the combined streams charged to the evaporators. This is about 75 percent recovery of the available limonene and in a typical commericalsize operation, the citrus limonene recovery is about 36,000 pounds per day. This is an improvement in recovery of about 18,000 pounds per day over existing citrus limonene recovery techniques.

Having thus described the invention, what is claimed is:

1. In a multiple effect evaporation process wherein aqueous liquors containing terpenes are concentrated by evaporation in a series of evaporation effects of the heated surface type, each of said effects having a condensing vapor zone and a boiling liquid zone, wherein terpenes and water vaporized in the boiling liquid zone of one effect flow to the condensing vapor zone of a subsequent effect and uncondensed vent vapors from said condensing vapor zone are withdrawn to a condensation zone for condensation and recovery of terpenes therefrom, the improvement which comprises; increasing the absolute pressure on said vent vapors to substantially raise the dew point temperature of said terpene component and decreasing the temperature of said vent vapors to a temperature below the dew point of said terpene component by indirect heat exchange in said condensation zone such that the temperature differential between the dew point temperature and the temperature of the vent vapors is substantially increased to yield a condensate containing immiscible terpene and water phases; collecting said condensate; and separating the immiscible condensate phases into a terpene phase and an aqueous phase.

2. The process of claim 1 wherein said immiscible condensate phases are separated by density differential into a terpene overflow phase and an aqueous underflow phase.

3. The process of claim 2 wherein condensate formed in the condensing vapor zone is cascaded through the condensing vapor zones of other effects in the series of evaporation effects.

4. The process of claim 2 wherein said uncondensed vent vapors are accumulated for withdrawal in the last effect in the series of evaporation effects by cascading said vent vapors through the condensing vapor zones of the effects in the series of evaporation effects.

5. The process of claim 2 wherein said aqueous liquor is black liquor from a woodpulp digestion process and said terpene is turpentine.

6. The process of claim 5 wherein the vent vapors are compressed to a pressure at least about 2 psi above the pressure in the condensing vapor zone from which said vent vapors are withdrawn for recovery.

7. The process of claim 6 wherein the vent vapors are compressed to a pressure at least about 7 psi above the pressure in the condensing vapor zone from which said vent vapors are withdrawn for recovery.

8. The process of claim 2 wherein said vent vapors are compressed to atmospheric pressure by steam jet compression.

9. The process of claim 8 wherein said steam jet compression is in two stages wherein the vapors are compressed to about 3 to about 10 psia in the first stage of said two stages and partially condensed by indirect interstage heat exchange, and the resulting condensate flows to said separating step with uncondensed vapor venting from said indirect interstage heat exchange being further compressed and condensed to atmospheric pressure in the second stage of said two stages.

10. The process of claim 9 wherein the compressed vapors from said second stage are condensed by indirect heat exchange at atmospheric pressure, the resulting liquid phase flows to the separating step and uncondensed gases from said indirect heat exchange at atmospheric pressure are vented.

11. The process of claim 2 wherein said immiscible terpene and water condensate phases are separated at a temperature ranging from about 125° F. to the boiling point of said condensate.

12. The process of claim 11 wherein said immiscible condensate phases are separated at a temperature ranging from about 140° F. to 200° F.

13. The process of claim 10 wherein uncondensed gases vented from the indirect heat exchange at atmospheric pressure are further cooled by direct contact with cold water, and the resulting liquid phase returned to the condensation step.

14. The process of claim 10 wherein uncondensed gases vented from the indirect heat exchange at atmospheric pressure are further cooled by direct contact with cold water, and the resulting liquid phase returned to the separating step.

15. The process of claim 1 wherein said terpene is citrus limonene and said aqueous liquors are peel oil/water emulsion or peel press liquors or mixtures thereof derived from the processing of citrus fruit to citrus juice.

16. The process of claim 15 wherein said immiscible condensate phases are separated by density differential into a terpene overflow phase and an aqueous underflow phase.

17. The process of claim 16 wherein said uncondensed vent vapors are accumulated for withdrawal in the last effect in the series of evaporation effects by cascading said vent vapors through the condensing vapor zones of the effects in the series of evaporation effects.

18. The process of claim 16 wherein condensate formed in the condensing vapor zones is cascaded through condensing vapor zones of the effects in the series of evaporation effects.

19. The process of claim 16 wherein the vent vapors are compressed to a pressure at least about 2 psi above the pressure in the condensing vapor zone from which said vent vapors are withdrawn for recovery.

20. The process of claim 16 wherein said vent vapors are compressed to atmospheric pressure by steam jet compression.

21. The process of claim 16 wherein said immiscible terpene and water phases are separated at a temperature ranging from about 125° F. to the boiling point of said condensate.

* * * * *